United States Patent [19]

Seiya et al.

[11] Patent Number: 4,859,533
[45] Date of Patent: Aug. 22, 1989

[54] COMPOSITE MATERIALS OF REINFORCED FIBERS

[75] Inventors: Yuji Seiya, Otsu; Hiroyuki Odawara, Moriyama, both of Japan

[73] Assignee: Toray Industries, Inc., Shiga, Japan

[21] Appl. No.: 98,148

[22] Filed: Sep. 18, 1987

[30] Foreign Application Priority Data

Jan. 21, 1986 [JP] Japan .................................. 61-10585
Aug. 1, 1986 [JP] Japan ............................... 61-180043

[51] Int. Cl.$^4$ .......................... D02G 3/00; B32B 9/00; B05D 3/12
[52] U.S. Cl. .................................... 428/366; 428/367; 428/375; 428/379; 428/372; 428/392; 428/396; 428/408; 428/413; 428/414
[58] Field of Search ............... 428/375, 379, 372, 366, 428/367, 392, 396, 408, 414, 413

[56] References Cited

U.S. PATENT DOCUMENTS 4,518,653 5/1985 McWilliams et al. .............. 428/396
4,555,446 11/1985 Sumida et al. ....................... 428/367

FOREIGN PATENT DOCUMENTS 57-123210 7/1982 Japan .
58-8724 1/1983 Japan .

Primary Examiner—P. C. Ives
Attorney, Agent, or Firm—Wegner & Bretschneider

[57] ABSTRACT

The present invention relates to advanced composite materials composed of reinforced fibers, and a polyvinyl formal and an epoxy resin composition hardened by dicyandiamide and/or a urea derivative. A specific polyvinyl formal resin and epoxy resin composition that is resistant to phase separation is disclosed. Also disclosed is a polyvinyl formal of 5 microns or less in average grain size finely dispersed in an epoxy resin composition which has enhanced tensile strength and elongation in the direction perpendicular to the fiber direction.

11 Claims, 2 Drawing Sheets

COMPOSITE MATERIALS OF REINFORCED FIBERS

BACKROUND OF THE INVENTION

The present invention relates to advanced composite materials.

Prepregs formed by impregnating a sheet of parallel fibers, for example, a sheet of parallel carbon fibers, glass fibers, aromatic polyamide fibers, etc. or woven cloth, etc. with a matrix resin are widely used in sporting and leisure areas as golf club shafts, fishing rods, racket frames, etc.

In recent years, there has been rapid growth in the number of applications of prepregs in various manufacturing industries. For example, prepregs have been used as materials for the aerospace industry, etc. In a typical manufacturing process, a prepreg is prepared as a lamination in a mold and worked into a composite using an autoclave, or is wound around a mandrel as tape wrapping, to be worked into a rod, shaft, etc. for practical use.

A continuous fiber reinforced composite material is high in tensile strength in its fiber direction, but its strength in the direction perpendicular to its fiber direction is generally lower, since it is dependent upon the matrix resin or the bond between the resin and the fibers. The elongation before breaking is also smaller in the perpendicular direction than in the fiber direction. For example, in the case of carbon fibers, it is 1.3% in the fiber direction, but only about 0.8% in the perpendicular direction. Even if a seemingly isotropic material is formed by alternately laminating a unidirectional material at 0 degree, 90 degrees, and 45 degrees, the composite material is first broken in the direction perpendicular to the fiber direction when the elongation in the perpendicular direction is low, and as a result the strength in the fiber direction cannot be sufficiently used. If the elastic modulus of the matrix resin is lowered, the elongation is enhanced, but the compressive strength is lowered. The object of the present invention is to enhance the strength and elongation in the perpendicular direction without lowering the elastic modulus, to thereby provide well balanced materials.

Various attempts have been made to improve the properties of epoxy resins by adding a polyvinyl acetal resin to an epoxy resin. Examples of the attempts are disclosed in the following:

In U.S. Pat. No. 3,172,921, a polybutadiene, polyvinyl formal, epoxy hardener and peroxide are added to a thermosetting resin such as epoxy resin or diallyl phthalate, to enhance electrical and physical properties.

In U.S. Pat. 3,239,598, a polyvinyl acetal, epoxy resin and a hardener such as urea resin, melamine resin or phenol resin are used for insulated wires.

In U.S. Pat. No. 3,571,491, an insulating material containing a polyester, epoxy, polyvinyl acetal resin and filler is used to provide a material good in mechanical and electrical properties.

In U.S Pat. No. 4,193,799, an epoxy, polyvinyl acetal resin and aromatic onium salt are mixed for use as a photoresist.

In U.S. Pat. No. 4,309,512, a latent hardener such as dicyandiamide is added to modified bismaleimide, epoxy resin and polyvinyl formal, to obtain a heat resistant resin composition.

As indicated by the patents above, the polyvinyl acetal resin is relatively good in compatibility with epoxy resins, and is useful for modifying various epoxy resins. It is also known that glass fibers, etc. can be impregnated with such blend resins, to form prepregs.

However, a chemical compound containing a functional group with a strong hydrogen bond has poor compatibility with the polyvinyl acetal resin. For example, if dicyandiamide is used to harden a mixture of an epoxy resin and a polyvinyl acetal resin, considerable phase separation occurs during hardening. Since phase separation lowers the strength, a high-strength advanced composite material could only be obtained by mixing with another resin high in compatibility, as disclosed in U.S. Pat. No. 4,309,512.

SUMMARY OF THE INVENTION

The present invention relates to composite materials composed of an epoxy resin composition and fibers hardened by dicyandiamide and/or a urea derivative, with a polyvinyl formal based resin (PVF) of 5 microns or less in average grain size finely dispersed in said hardened epoxy resin composition. The present invention also relates to prepregs impregnated with an epoxy resin composition inhibiting phase separation of polyvinyl formal during hardening. A composite material containing polyvinyl formal of 5 microns or less in average grain size finely dispersed in an epoxy resin composite material hardened by dicyandiamide and/or a urea derivative has enhanced tensile strength and elongation in the perpendicular direction, and does not have a lowered elastic modulus when the fibers are carbon fibers arranged in parallel. Such a composite material is obtained, for example, by melting and mixing a mixture of polyvinyl formal and an epoxy resin composition at a high temperature, cooling, and adding dicyandiamide and/or a urea derivative as a hardener. However, the problem of phase separation of polyvinyl formal generally occurs in a system which includes dicyandiamide and/or a urea derivative, during the heating and hardening steps.

The inventors have overcome the problem of phase separation by combining a specific polyvinyl formal resin and a specific epoxy resin composition. In another aspect of this application, the inventors have dispersed polyvinyl formal of 5 microns or less in average grain size into a composite material composed of an epoxy resin composition and fibers hardened by dicyandiamide and/or a urea derivative. They found that such a composite material has a greatly enhanced tensile strength and elongation in the direction perpendicular to the fiber direction.

The state of dispersion can be evaluated by using an electron microphotograph based on $OsO_4$ dyed ultrathin sectioning method. Large phase separation can also be observed with an optical microscope since phase separation causes a difference in density. The average grain size of 5 microns or less means that in the case of uniform dispersion of spherical grains, the number average of diameters of all the grains in a section of about 300 microns square is 5 microns or less. When the grains dispersed are oval or irregular, the false diameter of each grain should be expressed by (the longest length + the shortest length)/2, and if the number average of the diameters thus obtained of all the grains in a section of about 300 microns square is 5 microns or less, the grains conform to the present invention. The kinds of epoxy resins in the epoxy resin composition in this aspect of the application are not limited.

DESCRIPTION OF THE PREFERRED EMBODIMENTS

Figure 1:
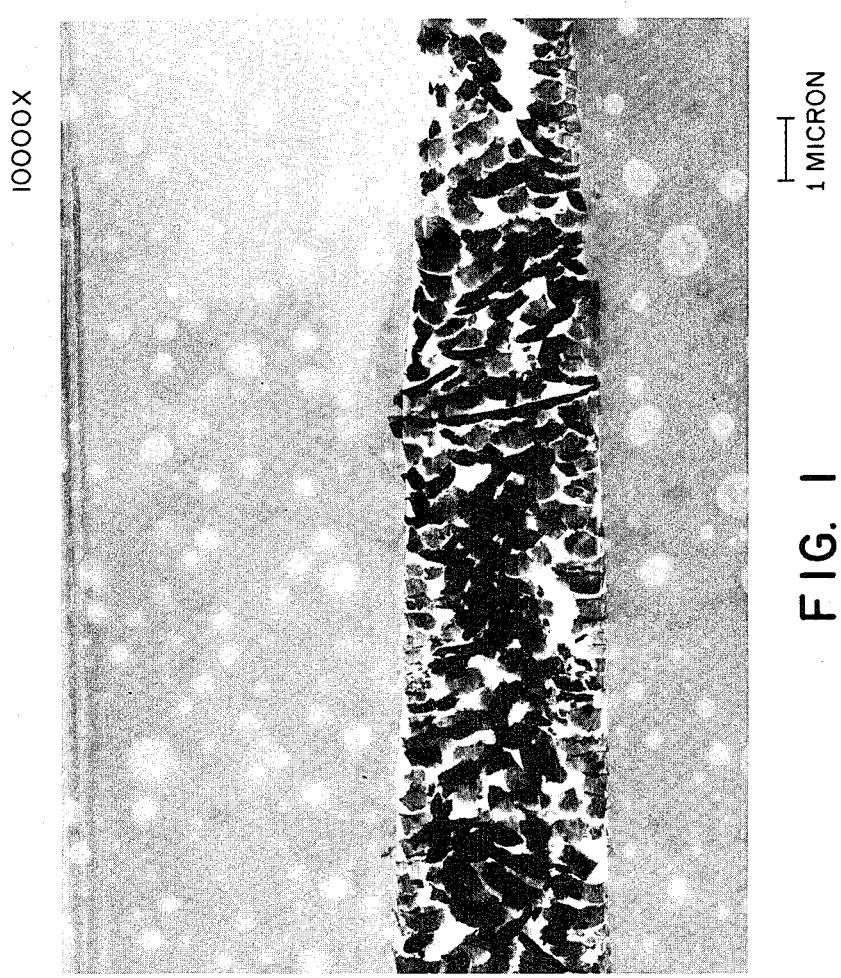
FIG. 1 is a microphotograph showing a section of a composite material conforming to the present invention.

Suitable resin compositions for the composite material of this application can be selected from those enumerated below. However, the resin compositions which can be used for the composite materials of this application are not limited to them.

1. Resin compositions obtained by adding 1 to 30 parts by weight of a polyvinyl formal based resin (PVF) to 100 parts by weight an epoxy resin composition containing 10 to 40 parts by weight of high molecular bisphenol type epoxy resins (A type, F type, S type) o 4000 or more in number average molecular weight and 20 to 45 parts by weight of a phenol novolak type and/or its modified epoxy resin, for melting and mixing, and furthermore adding dicyandiamide (DICY) and/or a urea derivative as a hardener, for mixing.

2. Resin compositions obtained by adding 1 to 30 parts by weight of a polyvinyl formal based resin (PVF) to 100 parts by weight of an epoxy resin composition consisting of 40 to 100 parts by weight of bisphenol type epoxy resins (A type, F type, S type) of 1800 to 3500 in number average molecular weight and 0 to 60 parts by weight of a phenol novolak type and/or its modified epoxy resin, for melting and mixing, and furthermore adding dicyandiamide (DICY) and/or a urea derivative, for mixing as a hardener.

3. Resin compositions, obtained by adding 1 to 30 parts by weight of a polyvinyl formal based resin (PVF) to 100 parts by weight of an epoxy resin composition consisting of 40 to 100 parts by weight of bisphenol type epoxy resins (A type, F type, S type,) of 360 to 1100 in number average molecular weight and 0 to 60 parts by weight of a phenol novolak type and/or its modified epoxy resin, for melting and mixing, and furthermore adding dicyandiamide (DICY) and/or a urea derivative, for mixing as a hardener.

In the resin compositions 1 the amount of epoxy resins of 4000 or more in molecular weight should be in a range from 10 to 40 parts by weight. If less than 10 parts by weight, the PVF is poorly dispersed. If more than 40 parts by weight, high resin viscosity and low workability are caused in addition to poor dispersibility. Preferably, the amount should be 20 to 30 parts by weight. The amount of the phenol novolak type epoxy resin should be in a range from 20 to 45 parts by weight. If less than 20 parts by weight, poor dispersibility and low heat resistance are caused. If more than 45 parts by weight, poor dispersibility is caused. Preferably, the amount should be 25 to 40 parts by weight.

The dispersion state of the PVF in the hardened substance greatly affects the properties of the hardened substance. If the grain size in the hardened substance is 10 microns or more, sufficient strength cannot be obtained. Preferably the grain size should be 5 microns or less.

In an example of resin composition 1, 10 to 40 parts by weight of phenol A type epoxy resins of 4000 or more in molecular weight, 20 to 45 parts by weight of phenol novolak type epoxy resin and 15 to 70 parts by weight of a further other epoxy resin are molted and mixed. 100 parts by weight of the epoxy resin composition are added to 1 to 30 parts by weight of a PVF and a hardener. The further other epoxy resin is not limited and can be, for example, a low molecular bisphenol A type epoxy resin. If the amount of the PVF is less than 1 part by weight, the improved physical properties cannot be obtained, and if more than 30 parts, poor dispersibility and adverse effect on water absorbability are caused. Preferably the amount should be 3 to 20 parts by weight, more preferably 5 to 15 parts by weight.

In the resin compositions 2, the number average molecular weight of the bisphenol A type epoxy resin composition composed of resins different in molecular weight should be 1800 to 3500. If the number average molecular weight is less than 1800, the PVF is greatly separated during hardening, and no enhanced physical properties are achieved.

If the number average molecular weight exceeds 3500, the mixture of epoxy resins and PVF becomes high in viscosity, to greatly reduce the workability of the mixture. At least 40 parts by weight of the bisphenol type epoxy resin composition must be used to prevent PVF separation. The PVF may be mixed with an epoxy resin composition consisting of 100% of said composition.

A phenol novolak type epoxy resin can be added in a range from 0 to 60 parts by weight. If more than 60 parts by weight, PVF dispersibility is lowered. Desirably the amount should be 25 to 40 parts by weight. The dispersion state of the PVF greatly affects the physical properties of the hardened substance. If the grain size is 10 microns or more, sufficient strength and elongation are difficult to obtain. Preferably, the grain size should be 5 microns or less.

Several bisphenol type epoxy resins can be selected to keep the number average molecular weight in a range from 1800 to 3500. Desirably a number average molecular weight from 2000 to 2500 is used.

In an example of resin composition 2, 40 to 100 parts by weight of such bisphenol type epoxy resins and 0 to 60 parts by weight of a phenol novolak type epoxy resin are molten and mixed. 1 to 30 parts by weight of a PVF and a hardener are mixed with 100 parts of the epoxy resin composition. If the amount of the PVF is less than 1 part by weight, the improved physical properties cannot be obtained, and if more than 30 parts by weight, water absorbability, etc. are adversely affected and fine dispersion is difficult to achieve. Preferably the amount should be 3 to 15 parts by weight, more preferably 5 to 10 parts by weight. The hardener can be dicyandiamide (DICY) and/or a urea derivative.

In said resin compositions 3, the number average molecular weight of the bisphenol type epoxy resin composition composed of resins different in molecular weight should be 360 to 1100. If the number average molecular weight is larger than 1100, the PVF is greatly separated during hardening, and no enhanced physical properties are achieved.

To prevent the separation of the PVF, at least 40 parts by weight of the bisphenol type epoxy resin composition must be used. The PVF may be mixed with an epoxy resin composition consisting of 100% of said composition.

A phenol novolak type epoxy resin can be added in a range from 0 to 60 parts by weight. If more than 60 parts by weight are added, PVF dispersibility is lowered. Preferably the amount should be 25 to 40 parts by weight. The dispersion state of the PVF greatly affects the physical properties of the hardened substance. If the grain size is 10 microns or more, sufficient strength and elongation are difficult to obtain. Preferably, the grain size should be 5 microns or less.

Several bisphenol type epoxy resins can be selected, to keep the number average molecular weight in a range from 360 to 1100. Preferably a number average molecular weight from 500 to 1000 is used.

In an example of resin composition 3, 40 to 100 parts by weight of such bisphenol type epoxy resins and 0 to 60 parts by weight of a phenol novolak type epoxy resin are molten and mixed. 1 to 30 parts by weight of a PVF and a hardener are mixed with 100 parts by weight of the epoxy resin composition. If the amount of the PVF is less than 1 part by weight, the improved physical properties cannot be obtained and if more than 30 parts by weight, water absorbability, etc. are adversely affected and fine dispersion is difficult to achieve. Preferably the amount should be 3 to 15 parts by weight, more preferably 5 to 10 parts by weight. The hardener can be dicyandiamide (DICY) and/or a urea derivative.

The bisphenol type epoxy resins can be selected from those commercially available. For example, bisphenol A type epoxy resins can be selected from Epikote 1009, 1007, 1004, 1001, 835, 828, 825, (made by Yuka Shell Epoxy, Epitoto YD-127, 128, 134, 011, 012, 014, 017, 019, 020, YD7017, 7019, YD7029, Phenototo YP50, YP50P, (made by Toto Kasei), Epicron 840, 850, 855, 860, 1050, 1010, 1030, 3050, 4050, 7050, (made by Dainippon Ink & Chemicals, Inc.), Dow Epoxy DER331, 332, 662, 663U, 662U, (Dow Chemical), Araldite 6071, 7071, 7072, (Ciba Geigy), etc. Bisphenol F type epoxy resins can be selected from Epicron 830, 830-S, 831 (made by Dainippon Ink & Chemicals, Inc.), Epikote 807 (made by Yuka Shell Epoxy), etc. Bisphenol S type epoxy resins can be selected from Epicron EXA-1514, 4023, 4031 (made by Dainippon Ink & Chemicals, Inc.). Urethane modified bisphenol A type epoxy resins can be selected from Adeka Resin EPV-6, 10, 15 (made by Asahi Denka), etc. Brominated bisphenol A type epoxy resins can be selected from Araldite 8011 (made by Ciba Geigy), Asahi Epoxy Resin AER711, 714 (made by Asahi Chemical Industry Co., Ltd.), Epicron 152, 1120, 153-60M, 1120-80M, 1125-75M (made by Dainippon Ink & Chemicals, Inc.), Dow Epoxy DER511 (made by Dow Chemical). Their prepolymers can also be used.

The phenol novolak type epoxy resin can be selected, from Epikote 152, 154 (made by Yuka shell Epoxy), Dow Epoxy DEN431, 438, 439, 485 (made by Dow Chemical), Ciba Geigy EPN1138, 1139 (made by Ciba Geigy). Modified cresol novolak type epoxy resins can be selected, for example, from Ciba Geigy, ECN1235, 1273, 1280, 1299 (made by Ciba Geigy), EOCN102, 103, 104 (made by Nippon Kayaku Co., Ltd.), Epicron N660, N665, N670, N673, N680, N690, N695 (Dainippon Ink & Chemicals, Inc.). Other modified phenol novolak epoxy resins can also be used.

The PVF is a resin consisting of 60 wt % of vinyl formal and 40 wt % of vinyl alcohol, vinyl acetate, etc. To enhance dispersibility, the PVF should be desirably 1000 or less, more desirably 600 or less in average polymerization degree. Such a PVF can be selected from those marketed, for example, Denka Formal #20, #30, #100, #200 (made by Denki Kagaku Kogyo, K.K.) and Vinylec B-2, B-1, E, F, L, K (made by Chisso).

EXAMPLE 1

3.5 kg (35 parts by weight) of Epikote (made by Yuka Shell Epoxy) and 2.0 kg (20 parts by weight) of Epikote 828 (made by Yuka Shell Epoxy) are employed as the bisphenol A type epoxy resins. The two resins have an average molecular weight of about 780. 3.0 kg (30 parts by weight) of Epicron N740 (made by Dainippon Ink & Chemicals, Inc.) and 1.5 kg (15 parts by weight) of Epikote 152 (made by Yuka Shell Epoxy) are employed as the phenol novolak type epoxy resins. 0.8 kg (8 parts by weight) of Denka Formal #20 (made by Denki Kagaku Kogyo K.K.) is employed as the PVF resin. These components are molten and mixed for 2 hours at 150° C., and cooled to 60° C. Then, 0.3 kg (3 parts by weight) of dicyandiamide (DICY) and 0.5 kg (5 parts by weight) of a urea derivative [dichlorophenyldimethylurea (DUMU)]as hardeners are added, and the mixture was stirred for 30 minutes, to obtain a resin composition. A sheet of releasing paper is coated with the resin composition, to form a resin sheet, and carbon fibers "T300" (made by Toray Industries, Inc.) are applied in a parallel pattern onto the resin sheet. Another sheet of releasing paper is placed on it, and the lamination is compressed by 120° C. hot rolls, to obtain a unidirectional prepreg. The prepreg is laminated in one direction, and molded at 130° C. for 2 hours using an autoclave, to obtain a unidirectional composite. It is cut in the direction perpendicular to the fibers by a diamond cutter, to prepare tension test pieces in the perpendicular direction. Tension tests are executed in the perpendicular direction. The results show, on the average, 9.1 kg/mm$^2$ as strength, 1.10% as elongation and 880 kg/mm$^2$ as elastic modulus. The PVF dispersion state in the hardened resin is observed, and the grain size is found to be 0.7 micron. A section of a test piece obtained in Example 1 is shown in FIG. 1 as a microphotograph. The white portions indicate the PVF, the gray portions indicate the epoxy resin composition, and the black portions indicate the carbon fibers.

EXAMPLE 2

4.0 kg (40 parts by weight) of Epikote 1001 (made by Yuka Shell Epoxy) and 2.5 kg (25 parts by weight) of Epikote 828 (made by Yuka Shell Epoxy) (the two resins having an average molecular weight of about 770) are employed as the bisphenol A type epoxy resins. 3.5 kg (15 parts by weight) of Epikote 152 (made by Yuka Shell Epoxy) is employed as a phenol novolak type epoxy resin. 1.5 kg (15 parts by weight) of Denka Formal #20 (made by Denki Kagaku Kogyo K.K.), is employed as the PVF resin. These components are molten and mixed at 150° C. for 2 hours and cooled to 60° C., and 0.3 kg (3 parts by weight) of DICY and 0.5 kg (5 parts by weight) of DUMU are added. The mixture is mixed for 30 minutes, to obtain a resin composition. As done in Example 1, the composition is made into a prepreg, and a unidirectional composite is prepared. Tension tests are executed in the perpendicular direction. The results show 8.2 kg/mm$^2$ as strength, 1.00% as elongation and 870 kg/mm$^2$ as elastic modulus. The PVF dispersed in the hardened resin is 3 to 4 microns in grain size.

COMPARATIVE EXAMPLE 1

To see the effect of PVF, a composition identical to the resin composition in Example 1 is prepared, except that the PVF is removed. The composition is made into a prepreg as done in Example 1, and a unidirectional composite is prepared. Tension tests are executed in the perpendicular direction, and the results showed 7.0 kg/mm$^2$ as strength, 0.72% as elongation and 850 kg/mm$^2$ as elastic modulus.

As can be seen from the results, the resin not containing any PVF was low both in the elongation and strength in the perpendicular direction.

COMPARATIVE example 2

Figure 2:
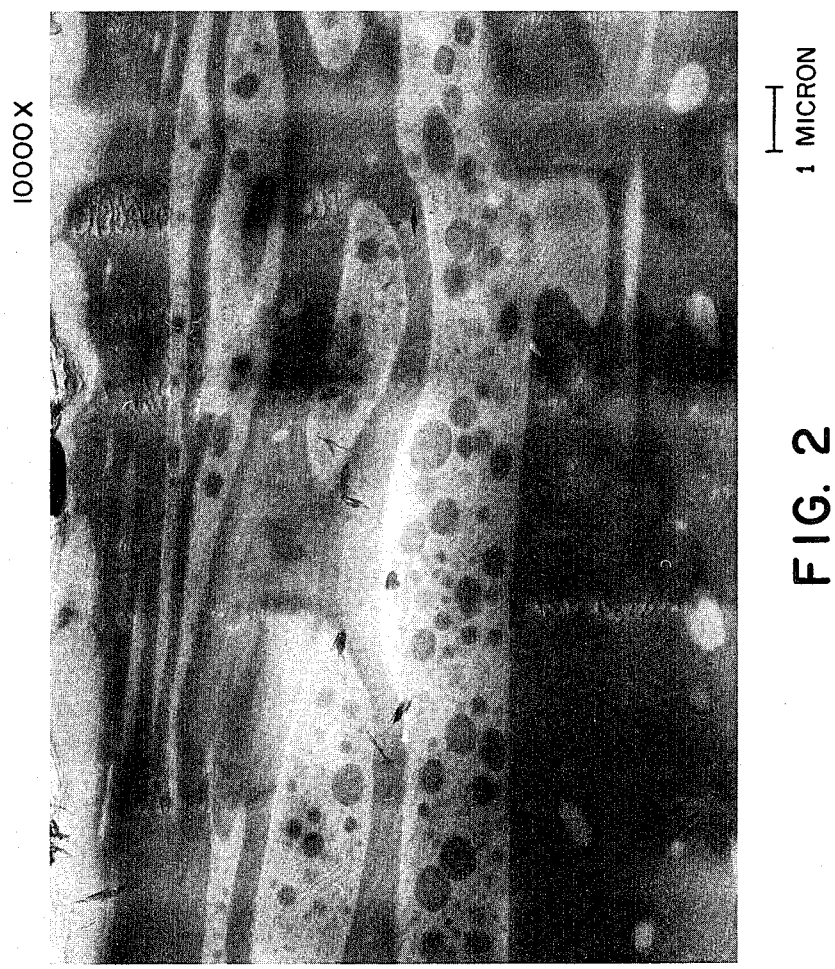
FIG. 2 is a microphotograph showing a composite material not conforming to the present invention (the size of the PVF grains is too large).

0.9 kg (9 parts by weight) of Epikote 1009 (made by Yuka Shell Epoxy) and 2.6 kg (26 parts by weight) of Epikote 1001 (made by Yuka Shell Epoxy) (about 1400 in average molecular weight) are employed as bisphenol A type epoxy resins, 2.0 kg (20 parts by weight) of Epicron N740 (Dainippon Ink & Chemicals, Inc.) and 1.5 kg (15 parts by weight) of Epikote 152 (made by Yuka Shell Epoxy) are employed as phenol novolak type epoxy resins. 0.8 kg (8 parts by weight) of Denka Formal #20 (made by Denki Kagaku Kogyo K.K.) is employed as a PVF resin. The components are molten and stirred at 150° C. for 2 hours and cooled to 60° C., and 0.3 kg of DICY and 0.5 kg of DUMU are added. The mixture is stirred for 30 minutes, to obtain a resin composition. It is made into a prepreg as done in Example 1, and a unidirectional composite is obtained. Tension tests are executed in the perpendicular direction, and the results show 6.6 kg/mm$^2$ as strength, 0.73% as elongation and 880 kg/mm$^2$ as elastic modulus without any enhancement in physical properties. The grains dispersed in the hardened resin are as coarse as 10 microns in grain size. A section of a test piece obtained in Comparative Example Example 2 is shown in FIG. 2 as a microphotograph. The white portions indicate the PVF, the gray portions indicate the epoxy resin composition, and the black portions indicate the carbon fibers.

As can be seen from the above, if the PVF is large in grain size, the strength in the perpendicular direction cannot be enhanced.

EXAMPLE 3

1.5 kg (15 parts by weight) of Epikote 1009 (made by Yuka Shell Epoxy), 2.0 kg (20 parts by weight) of Epikote 1001 (made by Yuka Shell Epoxy) and 2.0 kg (20 parts by weight) of Epikote 828 (made by Yuka Shell Epoxy) (the three resins having an average molecular weight of 1870) are employed as the bisphenol A type epoxy resins. 4.5 kg (45 parts by weight) of Epikote 152 (made by Yuka Shell Epoxy) are employed as a phenol novolak type epoxy resin. 0.6 kg (6 parts by weight) of Denka Formal #30 (made by Denki Kagaku Kogyo K.K.) is employed as a PVF resin. These components are molten and stirred at 150° C. for 2 hours and cooled to 60° C., and 0.3 kg of DICY and 0.5 kg of DUMU are added as hardeners. The mixture is stirred for 30 minutes, to obtain a resin composition. It is made into a prepreg as done in Example 1, and a unidirectional composite is obtained. Tension tests are executed in the perpendicular direction, and the results show 8.7 kg/mm$^2$ as strength, 1.08% as elongation and 900 kg/mm$^2$ as elastic modulus. The PVF grains dispersed in the hardened resin are about 3 microns in grain size.

EXAMPLE 4

2.5 kg (25 parts by weight) of Epikote 1009 (about 5000 in molecular weight, made by Yuka Shell Epoxy) is employed as a bisphenol A type epoxy resin (the resin having a molecular weight of 4000 or more). 3.0 k (30 parts by weight) of Epicron N740 (made by Dainippon Ink & Chemicals, Inc.) a phenol novolak type epoxy resin, is employed as a further other epoxy resin. 1.2 kg (12 parts by weight) of ELM120 (made by Sumitomo Chemical Co., Ltd.) is employed as a triglycidyl aminophenol, 0.8 kg (8 parts by weight) of Denka Formal #20 (made by Denki Kagaku Kogyo K.K.) is employed as a PVF. These components are molten and mixed at 150° C. for 2 hours, and cooled to 60° C., and 0.3 kg (3 parts by weight) of DICY and 0.4 kg (4 parts by weight) of DUMU are added. The mixture is stirred for 30 minutes, to obtain a resin composition. As done in Example 1, a prepreg is obtained, and a unidirectional composite is prepared. Tension tests are executed in the perpendicular direction, and the results show 8.4 kg/mm$^2$ as strength, 1.05% as elongation and 920 kg/mm$^2$ as elastic modulus. The PVF grains dispersed in the hardened resin are about 3 to 4 microns.

COMPARATIVE EXAMPLE 3

0.8 (8 parts by weight) of Epikote 1009 (about 5000 in molecular weight, made by Yuka Shell Epoxy) is employed as a bisphenol A type epoxy resin of 4000 or more in molecular weight. 3.0 kg (30 parts by weight) of Epicron N740 (made by Dainippon Ink & Chemicals Inc.) is employed as a phenol novolak type epoxy resin. 6.2 kg (62 parts by weight) of Epikote 828 (made by Yuka Shell Epoxy), a low molecular bisphenol A type epoxy resin is employed as a further other epoxy resin. 0.8 kg (8 parts by weight) of Denka Formal #20 (made by Denki Kagaku Kogyo K.K.) is employed as a PVF. These components are molten and mixed at 150° C. for 2 hours, and cooled to 60° C., and 0.3 kg (3 parts by weight) of DICY and 0.4 kg (4 parts by weight) of DUMU are added. The mixture is stirred for 30 minutes, to obtain a resin composition. As done in Example 1, it is made into a prepreg, and a unidirectional composite is prepared. The PVF grains dispersed after hardening are as coarse as 10 to 20 microns in grain size.

Tension tests were executed in the perpendicular direction, and the results showed 6.4 kg/mm$^2$ as strength, 0.76% as elongation and 860 kg/mm$^2$ as elastic modulus. Also from the results, it can be seen that if the PVF grains dispersed after hardening are large, a composite with enhanced physical properties cannot be obtained.

COMPARATIVE EXAMPLE 4

0.5 kg (5 parts by weight) of Epikote 1009 (made by Yuka Shell Epoxy) and 4.0 kg (40 parts by weight) of Epikote 828 (made by Yuka Shell Epoxy) (about 1340 in average molecular weight) are employed as bisphenol A type epoxy resins. 2.5 kg (25 parts by weight) of Epikote 154 (made by Yuka Shell Epoxy) is employed as a phenol novolak type resin. 1.0 kg (10 parts by weight) of Denka Formal #100 (made by Denki Kagaku K.K.) is employed as a PVF. These components are stirred at 150° C. for 2 hours and cooled to 60° C., and 0.3 kg of DICY and 0.4 kg of DUMU is added as hardeners. The mixture is stirred to obtain a resin composition. As done in Example 1, it is made into a prepreg, and a unidirectional composite is obtained. Tension tests are executed in the perpendicular direction, and the results show 6.2 kg/mm$^2$ as strength, 0.76% as elongation and 840 kg/mm$^2$ as elastic modulus without any enhancement in physical properties. The PVF grains dispersed in the hardened resin are as coarse as 15 microns.

If the grain size of the PVF dispersed is large like this, enhancement of physical properties cannot be obtained.

We claim:

1. A composite material, comprising an epoxy resin composition; reinforcing fibers; at least one hardener selected from the group consisting of dicyandiamide and urea derivatives; and a polyvinyl formal of 5 microns or less in grain size finely dispersed in said epoxy resin composition.

2. A composite material, according to claim 1, wherein said reinforcing fibers are selected from the group consisting of carbon fibers, aromatic polyamide fibers, glass fibers, silicon carbide fibers, boron fibers, alumina fibers and stainless steel fibers.

3. A composite material according to claim 2, wherein said reinforcing fibers are carbon fibers.

4. A composite material according to claim 1, wherein the amount of said polyvinyl formal is 1 to 30 weight parts based on 100 weight parts of said epoxy resin.

5. A composite material according to claim 1, wherein the amount of said polyvinyl formal is 3 to 20 weight parts based on 100 weight parts of said epoxy resin.

6. A composite material according to claim 1, wherein the amount of said polyvinyl formal is 5 to 15 weight parts based on 100 weight parts of said epoxy resin.

7. A composite material according to claim 1, wherein 100 parts of said epoxy resin composition contains 10 to 100 parts by weight of a bisphenol type epoxy resin.

8. A composite material according to claim 7, wherein 100 parts of said epoxy resin composition contains 40 to 100 parts by weight of a bisphenol type epoxy resin.

9. A composite material according to claim 7, wherein 100 parts of said epoxy resin composition contains 10 to 40 parts by weight of a bisphenol type epoxy resin.

10. A composite material according to claim 7, wherein 100 weight parts of said epoxy resin composition contains 20 to 45 parts by weight of a phenol novolak type epoxy resin.

11. A composite material according to claim 1, wherein the polyvinyl formal based resin is composed of 60% or more of vinyl formal and a balance of vinyl acetate and vinyl alcohol, and has an average polymerization degree of 1000 or less.

* * * * *